Feb. 1, 1949.  K. J. HILLQUIST  2,460,386
FEED MECHANISM FOR STONE CUTTING MACHINES
Filed March 7, 1947  2 Sheets-Sheet 1

INVENTOR
KARL J. HILLQUIST
BY Cook & Robinson
ATTORNEYS

Feb. 1, 1949.  K. J. HILLQUIST  2,460,386
FEED MECHANISM FOR STONE CUTTING MACHINES

Filed March 7, 1947  2 Sheets-Sheet 2

INVENTOR
KARL J. HILLQUIST
BY
Cook & Robinson
ATTORNEYS

Patented Feb. 1, 1949

2,460,386

UNITED STATES PATENT OFFICE 2,460,386

FEED MECHANISM FOR STONE CUTTING MACHINES

Karl J. Hillquist, Seattle, Wash.

Application March 7, 1947, Serial No. 733,089

5 Claims. (Cl. 125—13)

1

This invention relates to stone sawing equipment and it has reference more particularly to improvements in machines of that character wherein the sawing is effected by means of a disc type saw carried in a stationary mounting and the stone is mechanically advanced to the saw by a feed screw.

It is the principal object of my invention to provide means that operates automatically to determine the rate of advance of the stone to the saw, in accordance with the changes in degrees of hardness of the stone or to the changes in its resistance to being cut at any particular point. That is, a means whereby the rate of feeding of the stone against the saw will be automatically varied as the saw moves through a part of the stone of one degree of hardness into a part of another degree of hardness, thus to avoid damage either to the saw or to the stone that might result from too fast an advance.

More specifically stated, the main objects of my invention reside in the provision of a stone cutting saw of disc type, a stone holding carriage that is movable on guide rods under the action of a feed screw to advance a stone as held in the carriage against the saw, and a driving connection with the feed screw including a clutch drum fixed on a driving shaft and clutch shoes carried on an oscillating lever arm to effect the intermittent, rotatable advancement of the driver with the oscillating action of the lever in one direction only; the lever arm being oscillated in one direction by a cam wheel fixed on the rotatably driven saw shaft and in the other direction by a spring; its degree of oscillation being more or less in accordance with the cutting resistance of the stone thus to automatically regulate the rate of advancement of the stone to the saw.

Still further objects and advantages of the invention reside in the details of construction and combination of its parts, and in the mode of use of the machine, as will hereinafter be fully described.

In accomplishing these and other objects of the invention, I have provided the improved details of construction, the preferred forms of which are illustrated in the accompanying drawings, wherein—

Figure 1:
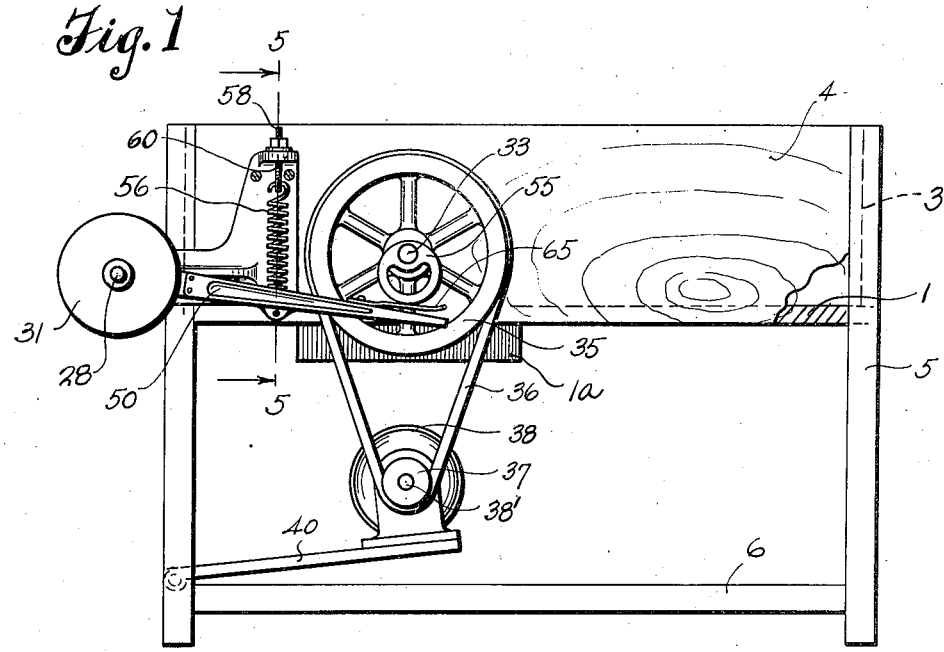
Fig. 1 is a side view of a stone cutting machine embodying the improvements of the present invention therein.

Referring more in detail to the drawings—

The present improvement is here shown as being embodied in a machine comprising a rectangular box like frame structure having a horizontal bottom wall 1, to which are attached the vertical, opposite end walls 2 and 3, and a side wall 4; these various parts being rigidly joined and the box-like structure supported at working height by legs 5 of angle iron affixed at its four corners. As noted in Fig. 1, the legs are joined across their lower end portions with cross bars 6 to insure rigidity and strength.

Figure 2:
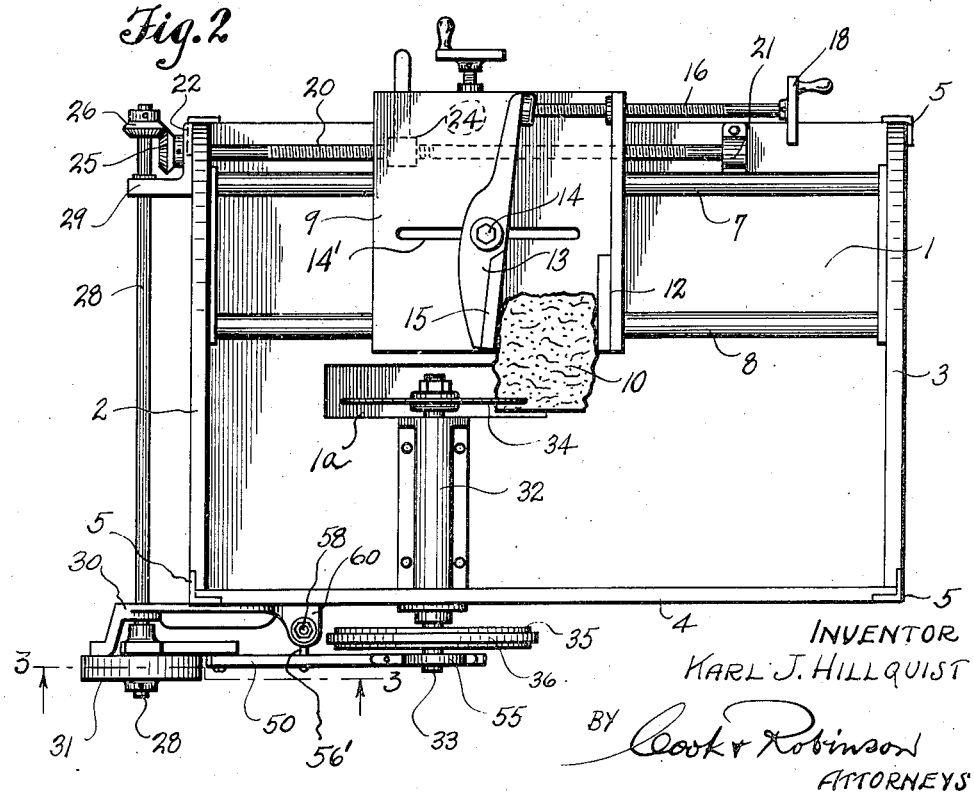
Fig. 2 is a top or plan view of the same.

Mounted in parallel, spaced relationship, in the frame, and extending horizontally between the end walls 2 and 3, as shown in Fig. 2, are rods 7 and 8 and mounted for travel thereon is a carriage, or table 9 in which a stone, such as that indicated at 10, may be held and advanced to the saw for cutting. The carriage has an upstanding flange 12 at one edge, operating as one jaw of a holding clamp, and there is a lever arm 13 attached between its ends by a pivot bolt 14 to the carriage and this lever has a flange 15 at one end operating as a jaw arranged to coact with the flange 12 for holding the stone 10 between them. The lever securing bolt 14 is adjustable along a slot 14' in the carriage base to accommodate the clamp to stones of different size. A clamp screw 16 is threaded through the flange 12 and at its inner end engages with clamping force against that end of the lever arm 13 that is opposite that end carrying flange 15, to hold the stone tightly and securely for the cutting operation. At its outer end, the screw shaft 16 is equipped with a hand wheel 18 for its easy adjustment.

A feed screw 20 for advancing the stone holding carriage, is mounted parallel with and at the outside of guide rod 7. The feed screw is revolubly contained at one end in a bearing block 21 that is fixed upon the bottom wall 1 of the frame, and at its other end extends through and is supported by a bearing bracket 22 fixed to the end wall 2. Between its two points of support, the feed shaft 20 is threaded, and is in threaded contact with a releasable nut 24 which may be of any suitable kind, that is fixed to the under side of the carriage plate 9 as shown in dotted lines in Fig. 2.

On the outer end of the feed screw 20 a beveled driving gear 25 is fixed. This is in operative mesh with a bevel gear 26 fixed on a driven shaft 28 that is rotatably mounted in bearings 29 and 30 fixed to the adjacent wall 2 of the frame structure. The shaft 28 extends beyond the wall 4 and has a drum 31 fixed thereto; the drum having cylindrically formed flange 31' about its periphery as observed in Fig. 4.

Mounted in a bearing 32 that is fixed on the bottom wall 1 of the frame, is the saw mounting and driving shaft 33, which at its inner end has a disc type saw 34 fixed thereon. The saw is disposed in a vertical plane, parallel with the direction of travel of the stone mounting carriage. The saw operates in a water sump 1a in bottom wall 1. Fixed on the outer end of shaft 33, is a belt pulley wheel 35 about which a driving belt 36 operates; the belt also passing about a smaller pulley wheel 37 that is mounted on the drive shaft 38' of an electric motor 38 that powers the saw and also the stone feed mechanism.

As seen in Fig. 1, the motor is mounted on a swing frame 40 and its weight maintains proper tension on the belt 36.

Figure 4:
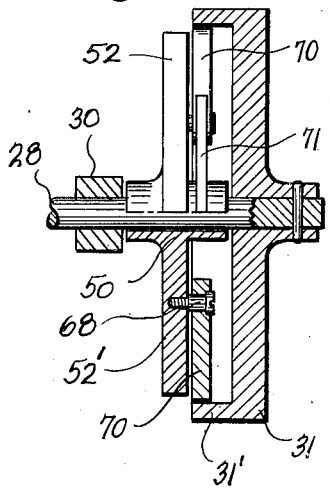
Fig. 4 is a section taken on line 4—4 in Fig. 3.

The important feature of this invention resides in the novel means for the automatic and controlled feeding of the stone to the saw. This automatic means comprises a horizontally directed lever arm 50 that is pivotally mounted at one end on the shaft 28 closely adjacent the inside of drum 31 as shown in Figs. 2 and 4. At its pivoted end, the lever arm has a vertically directed cross head, comprising the upwardly and downwardly directed arms 52 and 52'. The other end portion of lever 50 extends beneath and slightly beyond the outer end portion of the saw driving shaft 33, as noted in Fig. 1.

Figure 3:
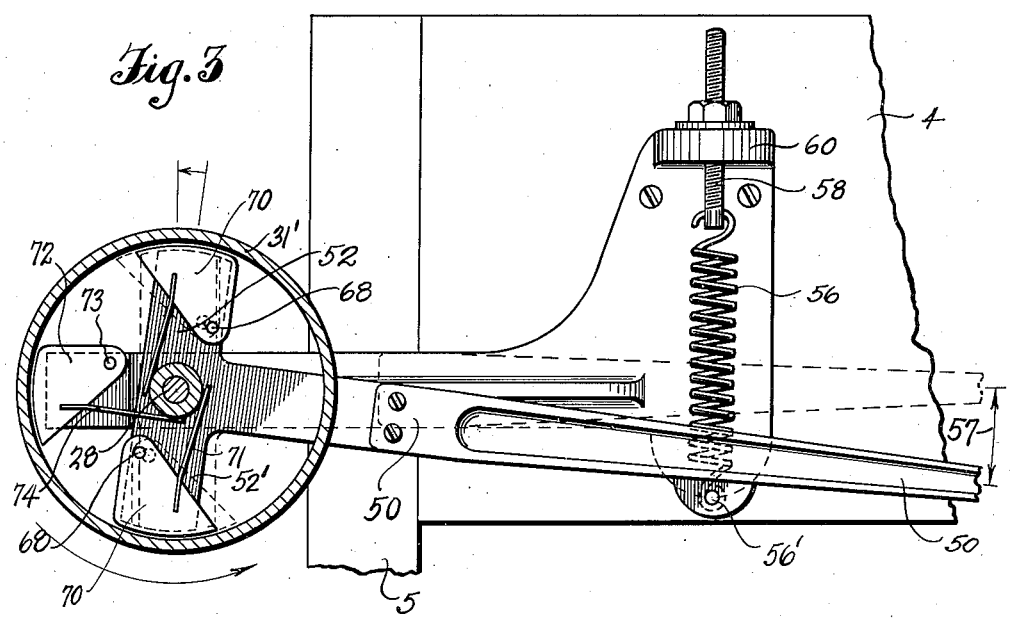
Fig. 3 is an enlarged, sectional view, taken on the line 3—3 in Fig. 2, particularly illustrating the drum advancing clutch mechanism and the oscillating lever arm that carries the clutch dogs thereon.
Figure 5:
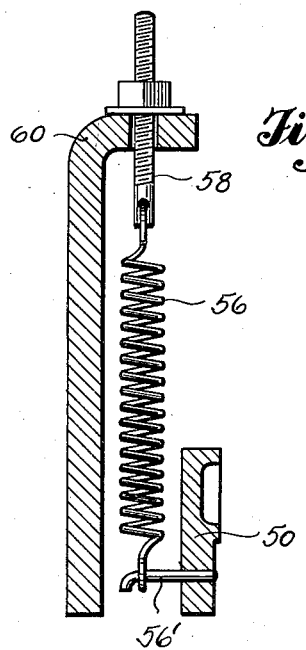
Fig. 5 is a section taken on line 5—5 in Fig. 1.

Fixed on the saw shaft, directly above lever 50, is an eccentrically mounted cam wheel 55 which acts against the lever 50 with each rotation of the shaft 33, to impart oscillatory action thereto, and it is shown best in Figs. 1 and 3, that the lever 50 is, at all times, drawn toward the cam by the pull of a coiled spring 56 that is attached at its lower end to a pin 56' mounted in the lever at a point about midway between its ends, as seen in Fig. 5, and attached at its other end to a tension adjusting bolt 58 that is threaded through a bracket 60 that is fixed to the wall 4 of the frame structure. It is to be understood that with each rotation of the saw shaft 33, the cam wheel 55 will operate to actuate the adjacent underlying end portion of the lever 50 downwardly and the spring 56 will operate to urge the lever back to its upper position as the cam wheel recedes; the maximum arc of oscillation is that indicated by the arrow at 57 between the full line and dotted line positions of the lever 50 in Fig. 3. However, this arc of oscillation will be reduced with an increase in degree of hardness of the stone or resistance to cutting.

It is shown in Fig. 1 that the cam wheel 55 does not engage directly against the lever, but against a shock relieving spring metal strip 65 that is attached to the top edge of lever arm and extends therealong and normally is in spaced relationship thereto.

Fixed pivotally, by means of pivot studs 68, to the oppositely directed cross head arms 52—52' and disposed just within the flange of the drum 31 are clutch shoes 70, having gripping surfaces adapted to engage against the drum flange; each shoe being urged to gripping position by a leafspring 71 that is mounted therein and which bears against the drive hub, thus to rotatably advance the drum only with each upward oscillation of the lever arm 50 as induced by the pull of spring 56.

A similar clutch shoe 72 is pivoted at 73 on the bearing 30, to engage with the drum flange to retain the drum against reverse turning when the lever 50 moves downwardly under the influence of cam wheel 55 and the clutch shoes move in a reverse direction. This shoe 72 is urged to gripping contact in the arm flange by a spring 74.

Assuming the apparatus to be so constructed and with the stone 10 mounted in the carriage for cutting by the saw, the mode of use of the machine and its automatic feeding operation is as follows:

With the saw shaft 28 being driven at a constant and uniform speed by means of the electric motor 38, the cam wheel 55 fixed on the saw driving shaft 33 will, with each turn of the shaft, actuate the free end of lever arm 50 downwardly; its head portion pivoting on the shaft 28. For example, the cam will actuate the lever from a raised position to the position in which it is shown in Fig. 1. As the cam recedes, after actuating the lever to this position, the lever will normally be pulled upwardly by the tension of spring 56 and this oscillating action will, by reason of the clutch dogs 70 engaging the drive flange, rotatably advance the drum, and this rotative movement, operating through shaft 28, gears 26 and 25 will rotate the feed screw 20 to advance the carriage.

A feature of the present invention resides in the fact that, if there is no appreciable resistance to cutting the stone by the saw, the advancement of the carriage by the feed screw will be relatively easy and there will be no appreciable resistance transmitted through the shaft 28 and drum, to the lifting of the lever arm 50 by the upward pull of spring 56. But, if the saw should engage with a portion of the stone of increased hardness, then the resistance to advancement of the saw into the stone will be increased accordingly and the upward movement, or return action of the lever arm as imparted thereto by the spring will be to a lesser extent and therefore the advancing action imparted to the drum will be decreased accordingly and the rate of advance of the stone slowed down. Thus, with the saw blade coming into cutting contact either with parts of a stone of lesser or greater degree of hardness, or resistance to cutting, the rate of advancement of the carriage will be speeded up or slowed down accordingly between the maximum and minimum speeds; it being understood that the motor drives the saw shaft at a constant speed.

It is to be pointed out that the pull imparted by spring 56 to the oscillating lever may be changed by adjusting the screw 58.

Devices of this kind automatically govern the sawing operation and insure against damage to the saw by reason of forced feed, and also avoid damaging the stone.

I claim:

1. In a stone sawing machine, a saw driving shaft, a feed screw for advancing a stone against the saw, a cam rotatable with the saw shaft, a lever arm mounted for oscillation and adapted to be freely actuated to one of its limits of oscillation by said cam with each rotation thereof and a spring means acting against the lever arm to urge it toward its other limit as the cam recedes therefrom, and a one-way clutch mechanism operatively connecting the lever arm and feed screw for the rotatable advancement of the screw only in accordance with the extent of return movements of the lever arm by said spring.

2. In a stone sawing machine, a stone cutting saw, a rotatably driven saw powering shaft, a stone mounting carriage and a carriage advancing means including a rotatable feed shaft; a cam wheel rotatable with the said saw powering shaft, a drum fixed on the said feed shaft, a lever arm mounted for oscillation adjacent the drum and adapted to be acted on by the said cam with each rotation thereof, to move it in one direction, a spring acting on the lever arm to urge it in the other direction, and a one-way clutch connection between the lever and drum for effecting its rotatable advancement in accordance with those movements of the lever induced by the spring.

3. In a stone sawing machine comprising a stone cutting saw, a saw mounting and driving shaft, a carriage on which a stone may be held for advancement to the saw, guideways for the carriage, and a feed screw for the advancement of the carriage; a cam wheel fixed on the saw driving shaft, a rotatable shaft for driving the feed screw, a drum fixed on said shaft, a lever arm pivoted at one end on said shaft for oscillating movement and having its other end portion extended to and adapted to be acted on by said cam with each rotation thereof to move it in one direction, and a spring attached under tension to said lever arm to pull it in the opposite direction, and a one-way clutch connection between the lever arm and drum whereby the latter will be advanced only in accordance with the movements of said lever arm that are induced by the spring.

4. A machine as recited in claim 3 including also means for varying the tension of the said spring.

5. A machine as recited in claim 3 including also means for varying the tension of the said spring and a spring cushioning means interposed between the cam and lever arm.

KARL J. HILLQUIST.

REFERENCES CITED

The following references are of record in the file of this patent:

UNITED STATES PATENTS

| Number | Name | Date |
|---|---|---|
| 232,000 | Clogston | Sept. 7, 1880 |
| 672,557 | Johnston | Apr. 23, 1901 |
| 1,385,731 | Taylor | July 26, 1921 |
| 2,142,506 | Gurney et al. | Jan. 3, 1939 |